United States Patent [19]

Gau et al.

[11] Patent Number: 5,041,473
[45] Date of Patent: Aug. 20, 1991

[54] PROCESS FOR PRODUCING CARBON BLACK FILLED POLYETHYLENE RESINS

[75] Inventors: Yimsan Gau, Somerset; John G. Victor, Bridgewater, both of N.J.

[73] Assignee: Union Carbide Chemicals and Plastics Technology Corporation, Danbury, Conn.

[21] Appl. No.: 541,515

[22] Filed: Jun. 21, 1990

[51] Int. Cl.$^5$ .............................................. C08K 5/54
[52] U.S. Cl. .................................. 523/330; 524/855; 526/88
[58] Field of Search ...................... 523/330; 524/855; 526/88

[56] References Cited

U.S. PATENT DOCUMENTS

| | | | |
|---|---|---|---|
| 3,127,368 | 3/1964 | Thomson | 524/855 |
| 3,179,648 | 4/1965 | Casale | 524/855 |
| 3,256,236 | 6/1966 | Herman | 524/855 |
| 3,325,442 | 6/1967 | McManimie | 524/855 |
| 4,877,587 | 10/1989 | Rhee | 526/88 |

Primary Examiner—Paul R. Michl
Assistant Examiner—Edward Cain
Attorney, Agent, or Firm—Clement J. Vicari

[57] ABSTRACT

A process for producing polyethylene resins containing carbon black in a gas fluidized bed reactor which comprises introducing into said reactor, polymerizable monomers capable of producing polyethylene resins at polymerizable reaction temperatures in the presence of a catalyst while directly introducing into said reactor during said polymerization, carbon black, in an amount to produce said polyethylene resins containing carbon black.

13 Claims, 1 Drawing Sheet

PROCESS FOR PRODUCING CARBON BLACK FILLED POLYETHYLENE RESINS

BACKGROUND OF THE INVENTION

1. Field of the Invention

The present invention relates to a process for producing carbon black filled polyethylene resins and more particularly to a process for producing carbon black filled polyethylene resins in situ in a fluidized bed reactor.

2. Description of the Prior Art

The introduction of high activity Ziegler-Natta catalyst systems has led to the development of new polymerization processes based on gas phase reactors such as disclosed in U.S. Pat. No. 4,482,687 issued Nov. 13, 1984. These processes offer many advantages over bulk monomer slurry processes or solvent processes. They are more economical and inherently safer in that they eliminate the need to handle and recover large quantities of solvent while advantageously providing low pressure process operation.

The versatility of the gas phase fluid bed reactor has contributed to its rapid acceptance. Alpha-olefins polymers produced in this type of reactor cover a wide range of density, molecular weight distribution and melt indexes. In fact new and better products have been synthesized in gas phase reactors because of the flexibility and adaptability of the gas phase reactor to a large spectrum of operating conditions.

Polyethylene resins are particularly amenable for production in fluidized bed reactors. For many industrial applications it is beneficial, if not required, that the polyethylene resins contain carbon black. For example, products which are currently being produced with carbon black filled polyethylene resins include pipes, tubes, sheets, wire and cable constructions, and other molded or extruded polyethylene articles.

Currently, carbon black filled polyethylene resins, used for example, in black jacketing applications are generally produced by either the masterbatch or the direct addition approach. The masterbatch technique normally involves three basic steps, i.e., the preparation of the natural feedstock; the preparation of the masterbatch containing carbon black; and the blending of the natural feedstock with the masterbatch which is thereafter compounded in an intensive mixer such as a Banbury mixer, a Farrel continuous mixer (FCM) or a single or twin screw extruder.

In the direct addition technique, the natural feedstock is produced, and a blend of carbon black and the natural resin is compounded in an intensive mixer such as a Banbury or a FCM mixer.

The masterbatch technique offers a number of advantages over the direct addition technique which include good dispersion of carbon black within the resin matrix particularly with low viscosity resins.

However both of these techniques are time consuming and expensive.

It would be extremely beneficial and economically attractive if carbon black filled polyethylene resins could be produced in situ, i.e., during the fluidized bed polymerization procedure, since the costly and time consuming steps discussed above could therefore be eliminated.

SUMMARY OF THE INVENTION

Broadly contemplated the present invention provides a process for producing polyethylene resins containing carbon black in a gas fluidized bed reactor which comprises introducing into said reactor, polymerizable monomers capable of producing polyethylene resins at polymerizable reaction temperatures in the presence of a catalyst while directly introducing into said reactor during said polymerization, carbon black, in an amount to produce said polyethylene resins containing carbon black.

DETAILED DESCRIPTION OF THE INVENTION

Figure 1:
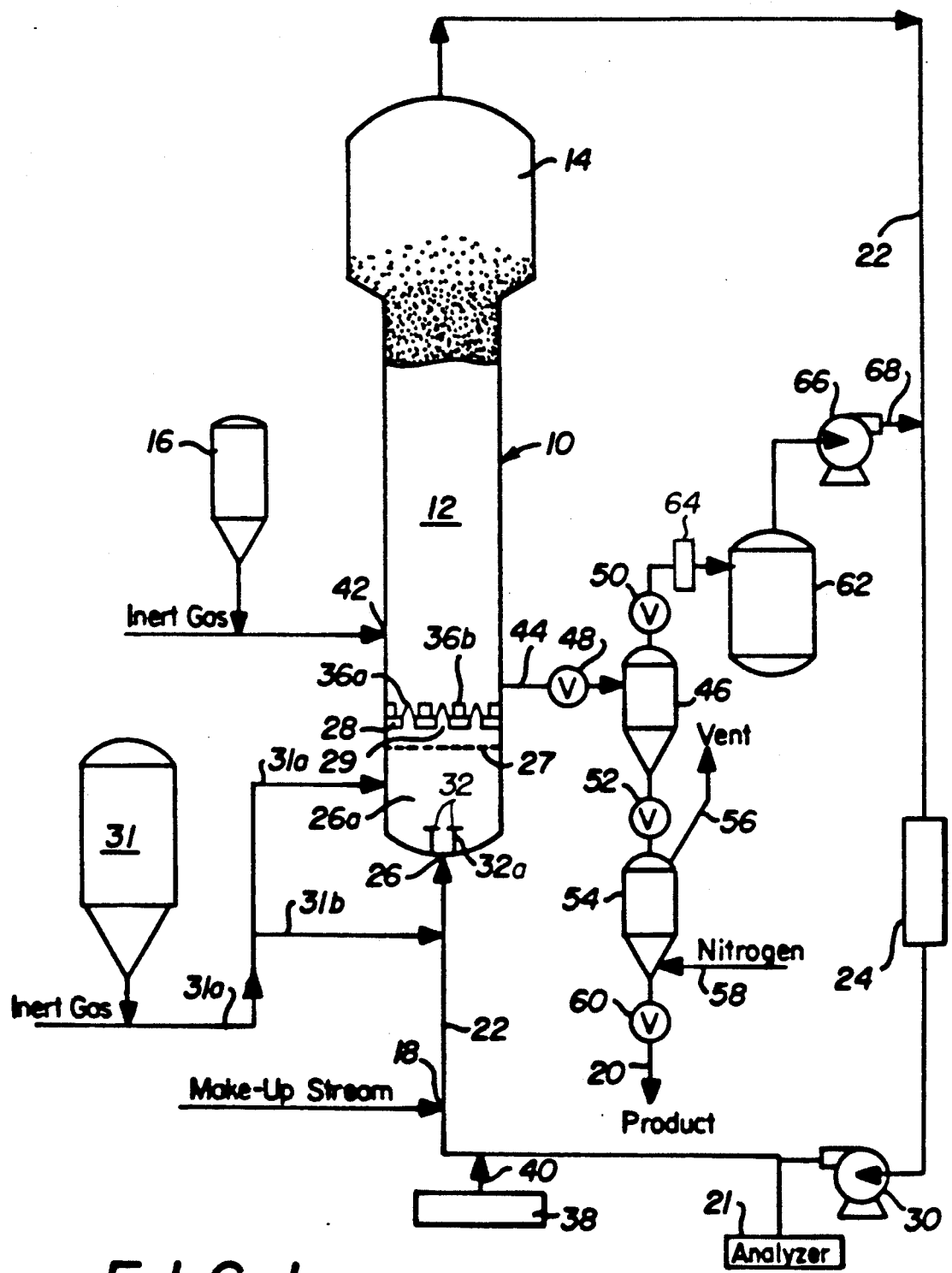
FIG. 1 illustrates a typical gas fluidized bed reaction scheme for producing polyethylene resin containing carbon black.

The fluidized bed reactor can be the one described in U.S. Pat. No. 4,558,790. Other types of conventional reactors for the gas phase production of polyethylene can also be employed. Under conventional procedures, at the start up, the bed is usually made up of polyethylene granular resin. During the course of the polymerization, the bed comprises formed polymer particles, growing polymer particles, and catalyst particles fluidized by polymerizable and modifying gaseous components introduced at a flow rate or velocity sufficient to cause the particles to separate and act as a fluid. The fluidizing gas is made up of the initial feed, make-up feed, and cycle (recycle) gas, i.e., monomer and, if desired, modifiers and/or an inert carrier gas.

The polyethylene resins produced in the process of the present invention are those which are characterized as "non-sticky" polymers, i.e., they are free-flowing polymers as contrasted for example to the "sticky polymers" described in the copending application Ser. No. 07/413,704 filed on Sept. 28, 1989 and which is assigned to a common assignee.

The polyethylene resins can be homopolymers of ethylene or copolymers of a major mol percent ($\geq$ 90%) of ethylene, and a minor mol percent ($\leq$ 10%) of one or more $C_3$ to $C_8$ alpha olefins. The preferred $C_3$ to $C_8$ alpha olefins are propylene, butene-1, pentene-1, hexene-1, and octene-1.

The ethylene polymers have a melt flow ratio of $\geq$ 18 to $\leq$ 150, and preferably of $\geq$ 30 to $\leq$ 80. The melt flow ratio value is another means of indicating the molecular weight distribution of a polymer.

The homopolymers have a density (gm/cc) of about $\geq 0.958$ to $\leq 0.972$ and preferably of about $\geq 0.961$ to $\leq 0.968$.

The copolymers have a density of about $\geq 0.91$ to $\leq 0.96$ and preferably $\geq 0.917$ to $\leq 0.955$, and most preferably, of about $\geq 0.917$ to $\leq 0.935$. The density of the copolymer, at a given melt index level for the copolymer, is primarily regulated by the amount of the $C_3$ to $C_8$ comonomer which is copolymerized with the ethylene. In the absence of the comonomer, the ethylene would homopolymerize with the catalyst of the present invention to provide homopolymers having a density of about $\geq 0.96$. Thus the addition of progressively larger amounts of the comonomers to the copolymers results in a progressive lowering of the density of the copolymer. The amount of each of the various $C_3$ to $C_8$ comonomers needed to achieve the same result will vary from monomer to monomer, under the same reaction conditions.

Thus, to achieve the same results, in the copolymers, in terms of a given density, at a given melt index level, large molar amounts of the different comonomers would be needed in the order of $C_3 > C_4 > C_5 > C_6 > C_7 > C_8$.

The melt index of a homopolymer or copolymer is a reflection of its molecular weight. Polymers having a relatively high molecular weight, have a relatively low melt index. Ultra-high molecular weight ethylene polymers have a high load (HLMI) melt index of about 0.0 and a very high molecular weight ethylene polymers have a high load melt index (HLMI) of about 0.0 to about 1.0. The polymers of the present invention have a standard or normal load melt index of $\geq 0.0$ to about 50, and preferably of about 0.5 to 35, and a high load melt index (HLMI) of about 7 to about 950. The melt index of the polymers which are used in the process of the present invention is a function of a combination of the polymerization temperature of the reaction, the density of the copolymer and the hydrogen/monomer ratio in the reaction system. Thus, the melt index is raised by increasing the polymerization temperature and/or by decreasing the density of the polymer and/or by increasing the hydrogen/monomer ratio.

The polymers of the present invention are produced as granular materials which have an average particle size of the order of about 0.005 to about 0.06 inches, and preferably of about 0.02 to about 0.04 inches, in diameter. The particle size is important for the purposes of readily fluidizing the polymer particles in the fluid bed reactor, as described below. The polymers of the present invention have a settled bulk density of about 15 to 32 pounds per cubic foot.

The carbon black filled homopolymers and copolymers of the present invention are useful for a wide variety of purposes particularly in black jacketing applications and pipe.

The carbon black materials which are employed in the process have a primary particle size of about 10 to 100 nano meters and an average size of aggregate (primary structure) of about 0.1 to about 10 microns. The specific surface area of the carbon black is about 30 to 1,500 $m/^2$ gm and display a dibutylphthalate (DBP) absorption of about 80 to about 350 cc/100 grams.

The amount of carbon black utilized generally depends on the type of polymer to be produced. In general, the carbon black can be employed in amounts of about 0.1% to about 50% by weight preferably about 2% to about 40% based on the weight of the final product produced.

The carbon black can be introduced into the reactor either at the bottom of the reactor or to the recycle line directed into the bottom of the reactor. It is preferred to treat the carbon black prior to entry into the reactor to remove traces of moisture and oxygen. This can be accomplished by purging the material with nitrogen gas, and heating by conventional procedures.

A fluidized bed reaction system which is particularly suited for production of polyolefin resin by the practice of the process of the present invention is illustrated in the drawing. With reference thereto and particularly to FIG. 1, the reactor 10 comprises a reaction zone 12 and a velocity reduction zone 14.

In general, the height to diameter ratio of the reaction zone can vary in the range of about 2.7:1 to about 5:1. The range, of course, can vary to larger or smaller ratios and depends upon the desired production capacity. The cross-sectional area of the velocity reduction zone 14 is typically within the range of about 2.5 to about 2.9 multiplied by the cross-sectional area of the reaction zone 12.

The reaction zone 12 includes a bed of growing polymer particles, formed polymer particles and a minor amount of catalyst all fluidized by the continuous flow of polymerizable and modifying gaseous components in the form of make-up feed and recycle fluid through the reaction zone. To maintain a viable fluidized bed, the superficial gas velocity (SGV) through the bed must exceed the minimum flow required for fluidization which is typically from about 0.2 to about 0.8 ft/sec. depending on the average particle size of the product. Preferably the SGV is at least 1.0 ft/sec. above the minimum flow for fluidization of from about 1.2 to about 6.0 ft/sec. Ordinarily, the SGV will not exceed 6.0 ft/sec. and it is usually no more than 5.5 ft/sec.

Particles in the bed help to prevent the formation of localized "hot spots" and to entrap and distribute the particulate catalyst through the reaction zone. Accordingly, on start up, the reactor is charged with a base of particulate polymer particles before gas flow is initiated. Such particles may be the same as the polymer to be formed or different. When different, they are withdrawn with the desired newly formed polymer particles as the first product. Eventually, a fluidized bed consisting of desired polymer particles supplants the start-up bed.

The catalysts used are often sensitive to oxygen, thus the catalyst used to produce polymer in the fluidized bed is preferably stored in a reservoir 16 under a blanket of a gas which is inert to the stored material, such as nitrogen or argon.

Fluidization is achieved by a high rate of fluid recycle to and through the bed, typically on the order of about 50 to about 150 times the rate of feed of make-up fluid. This high rate of recycle provides the requisite superficial gas velocity necessary to maintain the fluidized bed. The fluidized bed has the general appearance of a dense mass of individually moving particles as created by the percolation of gas through the bed. The pressure drop through the bed is equal to or slightly greater than the weight of the bed divided by the cross-sectional area. It is thus dependent on the geometry of the reactor.

Make-up fluid can be fed at point 18 via recycle line 22 although it is also possible to introduce make up fluid between heat exchanger 24 and velocity reduction zone 14 in recycle line 22. The composition of the recycle stream is measured by a gas analyzer 21 and the composition and amount of the make-up stream is then adjusted accordingly to maintain an essentially steady state gaseous composition within the reaction zone.

The gas analyzer is a conventional gas analyzer which operates in conventional manner to indicate recycle stream composition and which is adapted to regulate the feed and is commercially available from a wide variety of sources. The gas analyzer 21 can be positioned to receive gas from a point between the velocity reduction zone 14 and the dispenser 38, preferably after the compressor 30.

To ensure complete fluidization, the recycle stream and, where desired, part of the make-up stream are returned through recycle line 22 to the reactor at base 26 below the bed preferably there is a gas distributor plate 28 above the point of return to aid in fluidizing the bed uniformly and to support the solid particles prior to start-up or when the system is shut down. The stream passing upwardly through the bed absorbs the heat of reaction generated by the polymerization reaction.

The portion of the gaseous stream flowing through the fluidized bed which did not react in the bed becomes the recycle stream which leaves the reaction zone 12 and passes into a velocity reduction zone 14 above the bed where a major portion of the entrained particles drop back into the bed thereby reducing solid particle carryover.

The recycle stream exiting the compressor is then returned to the reactor at its base 26 and thence to the fluidized bed through a gas distributor plate 28. A fluid flow deflector 32 is preferably installed at the inlet to the reactor to prevent contained polymer particles from settling out and agglomerating into a solid mass and to maintain entrained or to re-entrain any liquid or solid particles which may settle out or become disentrained.

The fluid flow deflector, comprises an annular disc supported at a stand off distance above the reactor inlet 26 by the spacers 32a and divides the entering recycle stream into a central upward flow stream and an upward peripheral annular flow stream along the lower side walls of the reactor. The flow streams mix and then pass through protective screen 27, the holes or ports 29 of the distributor plate 28 and the angle caps 36a and 36b, secured to the upper surface of the distributor plate, and eventually into the fluidized bed.

The central upward flow stream in the mixing chamber 26a assists in the entrainment of liquid droplets in the bottom head or mixing chamber and in carrying the entrained liquid to the fluidized bed section during a condensing mode of reactor operation. The peripheral flow assists in minimizing build-up of solid particles in the bottom head because it sweeps the inner surfaces of the reactor walls. The peripheral flow also contributes to the re-atomization and re-entrainment of any liquid which may be disentrained at the walls or accumulate at the bottom of the diffuser mixing chamber, particularly with a high level of liquid in the recycle stream. The annular deflector means 32, which provides both central upward and outer peripheral flow in the mixing chamber, permits a reactor to be operated without the problems of liquid flooding or excessive build up of solids at the bottom of the reactor.

The temperature of the bed is basically dependent on three factors: (1) the rate of catalyst injection which controls the rate of polymerization and the attendant rate of heat generation; (2) the temperature of the gas recycle stream and (3) the volume of the recycle stream passing through the fluidized bed. Of course, the amount of liquid/solid introduced into the bed either with the recycle stream and/or by separate introduction also affects the temperature since this liquid vaporizes in the bed and solids typically absorb heat both of which serve to reduce the temperature. Normally the rate of catalyst injection is used to control the rate of polymer production. The temperature of the bed is controlled at an essentially constant temperature under steady state conditions by constantly removing the heat of reaction. By "steady state" is meant a state of operation where there is no change in the system with time. Thus, the amount of heat generated in the process is balanced by the amount of heat being removed and the total quantity of material entering the system is balanced by the amount of material being removed. As a result, the temperature, pressure, and composition at any given point in the system is not changing with time. No noticeable temperature gradient appears to exist within the upper portion of the bed. A temperature gradient will exist in the bottom of the bed in a layer or region extending above the distributor plate, e.g., for about 6 to about 12 inches, as a result of the difference between the temperature of the inlet fluid and temperature of the remainder of the bed. However, in the upper portion or region above this bottom layer, the temperature of the bed is essentially constant at the maximum desired temperature.

Good gas distribution plays an important role in the efficient operation of the reactor. The fluidized bed contains growing and formed particulate polymer particles, carbon black particles as well as catalyst particles. As the polymer particles are hot and possible active, they must be prevented from settling, for if a quiescent mass is allowed to exist, any active catalyst present will continue to react and can cause fusion of the polymer particles resulting, in an extreme case, in the formation of a solid mass in the reactor which can only be removed with great difficulty and at the expense of an extended downtime. Since the fluidized bed in a typical commercial size reactor may contain many thousand pounds of solids at any given time, the removal of a solid mass of this size would require a substantial effort. Diffusing recycle fluid through the bed at a rate sufficient to maintain fluidization throughout the bed is, therefore, essential.

Any fluid inert to the catalyst and reactants and which, if a liquid, will volatilize under the conditions present in the fluidized bed, can also be present in the recycle stream. Other materials, such as catalyst activator compounds, if utilized are preferably added to the reaction system downstream from compressor 30. Thus the materials may be fed into the recycle system from dispenser 38 through line 40 as shown in FIG. 1.

The fluid bed reactor may be operated at pressures of up to about 1000 psig. The reactor is preferably operated at a pressure of from about 250 to about 500 psig, with operation at the higher pressures in such ranges favoring heat transfer since an increase in pressure increases the unit volume heat capacity of the gas.

The catalyst which is preferably a transition metal catalyst is injected intermittently or continuously into the bed at a desired rate at a point 42 which is above the distributor plate 28. Preferably, the catalyst is injected at a point in the bed where good mixing with polymer particles occurs. Injecting the catalyst at a point above the distributor plate is an important feature for satisfactory operation of a fluidized bed polymerization reactor. Since catalysts are highly active, injection of the catalyst into the area below the distributor plate may cause polymerization to begin there and eventually cause plugging of the distributor plate. Injection into the fluidized bed aids in distributing the catalyst throughout the bed and tends to preclude the formation of localized spots of high catalyst concentration which may result in the formation of "hot spots". Injection of the catalyst into the reactor is preferably carried out in the lower portion of the fluidized bed to provide uniform distribution and to minimize catalyst carryover into the recycle line where polymerization may begin and plugging of the recycle line and heat exchanger may eventually occur.

A gas which is inert to the catalyst, such as nitrogen or argon, is preferably used to carry the catalyst into the bed.

The carbon black materials are introduced into the reactor from Vessel 31 through line 31a together with inert gas or alternatively through 31b where it is joined with recycle line 22.

The rate of polymer production in the bed depends on the rate of catalyst injection and the concentration of monomer(s) in the recycle stream. The production rate is conveniently controlled by simply adjusting the rate of catalyst injection.

Under a given set of operating conditions, the fluidized bed is maintained at essentially a constant height by withdrawing a portion of the bed as product at the rate of formation of the particular polymer product. Complete instrumentation of both the fluidized bed and the recycle stream cooling system is, of course, useful to detect any temperature change in the bed so as to enable either the operator or a conventional automatic control system to make a suitable adjustment in the temperature of the recycle stream or adjust the rate of catalyst injection.

On discharge of particulate polymer product from the reactor 10, it is desirable, and preferable, to separate fluid from the product and to return the fluid to the recycle line 22. There are numerous ways known to the art to accomplish this. One system is shown in the drawings. Thus, fluid and product leave the reactor 10 at point 44 and enter the product discharge tank 46 through a valve 48 which is designed to have minimum restriction to flow when opened, e.g., a ball valve. Positioned above and below product discharge tank 46 are conventional valves 50, 52 with the latter being adapted to provide passage of product into the product surge tank 54. The product surge tank 54 has venting means illustrated by line 56 and gas entry means illustrated by line 58. Also positioned at the base of product surge tank 54 is a discharge valve 60 which, when in the open position, discharges product for conveying to storage. Valve 50, when in the open position, releases fluid to surge tank 62. Fluid from product discharge tank 46 is directed through a filter 64 and thence through surge tank 62, a compressor 66 and into recycle line 22 through line 68.

In a typical mode of operation, valve 48 is open and valves 50, 52 are in a closed position. Product and fluid enter product discharge tank 46. Valve 48 closes and the product is allowed to settle in product discharge tank 46. Valve 50 is then opened permitting fluid to flow from product discharge tank 46 to surge tank 62 from which it is continually compressed back into recycle line 22. Valve 50 is then closed and valve 52 is opened and product in the product discharge tank 46 flows into the product surge tank 54. Valve 52 is then closed. The product is purged with inert gas preferably nitrogen, which enters the product surge tank 54 through line 58 and is vented through line 56. Product is then discharged from product surge tank 54 through valve 60 and conveyed through line 20 to storage.

The particular timing sequence of the valves is accomplished by the use of conventional programmable controllers which are well known in the art. The valves can be kept substantially free of agglomerated particles by installation of means for directing a stream of gas periodically through the valves and back to the reactor.

The following Examples will illustrate the present invention.

EXAMPLE 1

This Example demonstrates the production of carbon filled polyethylene resins by conventional procedures i.e, by the direct addition technique.

An ethylene butene copolymer resin was produced in a fluidized bed reactor under conventional procedures using a titanium catalyst at reactor temperatures of about 85° C. The superficial gas velocity was typically about 1.8 ft/s. The copolymer had a density of 0.920 and a melt index of about 0.76 gm/10 min. The product is available from Union Carbide Chemicals and Plastics Company Inc. under the designation GRSN 7510.

The resin was added to a high intensity mixer (FCM) together with about 2½% of pelletized carbon black available from Columbian Chemical Co. Type N110 and a conventional additive package.

The carbon filled products produced were thereafter extruded into pelletized form which can then be sold commercially for a variety of applications such as wire and cable, pipe and sheet applications.

EXAMPLE 2

This Example demonstrates the production of carbon filled resins by the masterbatch technique.

The procedure of Example 1 was repeated to produce the polyethylene resin of Example 1.

A masterbatch was prepared by mixing the resin with 35 to 50% carbon black used in Example 1 in a high intensity mixer such as a FCM. The pelleted masterbatch was subsequently let down into the produced polyethylene resin in a second mixing step performed in a Banbury mixer.

The carbon filled products were thereafter extruded into pelletized form for use in conventional areas of use.

In both Examples 1 and 2 the carbon black was mixed with the resin in a molten state resulting in the carbon black being encapsulated by the resin.

EXAMPLE 3

This Example demonstrates the production of carbon filled ethylene butene copolymers (as in Example 1) according to the process of the present invention.

The fluidized bed reactor used was a pilot mechanically fluidized bed reactor (inner diameter of about 16 inches) with a vanadium catalyst at a reactor temperature of about 85° C. at 300 psig. Trisobutyl aluminum (TIBA) and UCON II were used as the cocatalyst and promoter, respectively.

The typical value of $H_2/C_2$ ratios was about 0.024. The superficial gas velocity was typically equivalent to about 1.8 ft/s. Carbon black in fluff form as in Examples 1 and 2 was continuously added directly to the reactor in an amount of about 3% by weight based on the weight of the total weight of the produced carbon black filled resin.

The resin which was produced in granular form had a carbon black coating on its surface and the carbon coated resin had a density of 0.9371 gm/cc. The carbon black content of the resin was 3.29%. The produced carbon black filled resin was uniformly black, indicating a good coating by incorporation of carbon black onto the resin particles. Unlike the carbon black resin particles of Examples 1 and 2 the carbon black resin particles of the invention were coated on the outer surface of the resin and not distributed throughout the resin. The resin did not smear on handling. On extrusion of the granular material, the carbon coated resin of the instant invention was found to be similar in mixing qualities as the resins produced by Examples 1 and 2. Advantageously, no smearing of the product resin was evident.

EXAMPLE 4

The procedure of Example 3 was repeated except that the carbon black utilized was in pelleted form as in Examples 1 and 2.

The amount of carbon black utilized was about 4.1% by weight. The produced resin had a carbon black coating on its surface and a density of 0.9330. The carbon black content of the resin was 4.1% based on the total weight of the resin. The product extruded well and had no smearing of the carbon black.

What is claimed is:

1. A process for producing polyethylene resins containing carbon black in a gas fluidized bed reactor which comprises introducing into said reactor, polymerizable monomers capable of producing polyethylene resins at polymerizable reaction temperatures in the presence of a catalyst while separately directly introducing into said reactor during said polymerization, carbon black, in an amount to produce said polyethylene resins containing carbon black.

2. A process according to claim 1 wherein said carbon black is employed in an amount of about 0.1% to about 50% by weight of the final polymer product.

3. A process according to claim 1 wherein said carbon black is employed in an amount of about 2% to about 40% by weight of the final polymer product.

4. A process according to claim 1 wherein said polyethylene resins are homopolymers of ethylene or copolymers of a major mol percent ($\geq 90\%$) of ethylene, and a minor mol percent ($\leq 10\%$) of one or more $C_3$ to $C_8$ alpha olefins.

5. A process according to claim 4 wherein said ethylene polymers have a melt flow ratio of $\geq 18$ to $\leq 150$.

6. A process according to claim 5 wherein said copolymers of ethylene have a density of about $\geq 0.91$ to $\leq 0.96$ gm/cc.

7. A process according to claim 5 wherein said copolymers of ethylene have a density of about $\geq 0.917$ to $\leq 0.935$ gm/cc.

8. A process according to claim 1 wherein said carbon black has a primary particle size of about 10 to about 100 nanometers, an average size of aggregate of about 0.1 to about 10 microns, a specific surface area of about 30 to about 1,500 $m^2$/gm and a dibutylphthalate absorption of about 80 to about 350 cc/100 grams.

9. A process according to claim 1 wherein said polyethylene resins are ethylene-butene-1 copolymers.

10. A process for producing ethylene copolymer resins containing carbon black in a gas fluidized bed reactor which comprises introducing into said reactor polymerizable monomers capable of producing ethylene copolymer resins at polymerizable reactor temperatures in the presence of a catalyst, while directly introducing into said reactor during said polymerization carbon black in an amount of about 0.1% to about 50% by weight of the final polymer product, said carbon black having a primary particle size of about 10 to about 100 nanometers, an average size of aggregate of about 0.1 to about 10 microns, a specific surface area of about 30 to about 1,500 $m^2$/gm and a dibutylphthalate absorption of about 80 to about 350 cc/100 grams.

11. A process according to claim 10 wherein said carbon black is introduced into said reactor in an amount of about 2% to about 40% by weight of the final polymer product.

12. A process according to claim 10 wherein said ethylene copolymers are copolymers of a major mol percent ($\geq 90\%$) of ethylene, and a minor mol percent ($\leq 10\%$) of one or more $C_3$ to $C_8$ alpha olefins.

13. A process according to claim 10 wherein said copolymers of ethylene are ethylene-butene-1 copolymers.

* * * * *